US012656813B2

(12) United States Patent
Yim

(10) Patent No.: US 12,656,813 B2
(45) Date of Patent: Jun. 16, 2026

(54) DISPLAY DEVICE

(71) Applicant: SAMSUNG DISPLAY CO., LTD., Yongin-si (KR)

(72) Inventor: Dale Yim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 108 days.

(21) Appl. No.: 18/829,513

(22) Filed: Sep. 10, 2024

(65) Prior Publication Data

US 2025/0264909 A1 Aug. 21, 2025

(30) Foreign Application Priority Data

Feb. 16, 2024 (KR) ........................ 10-2024-0022538

(51) Int. Cl.
*G06F 1/16* (2006.01)
*G09F 9/30* (2006.01)

(52) U.S. Cl.
CPC ............ *G06F 1/1616* (2013.01); *G09F 9/301* (2013.01)

(58) Field of Classification Search
CPC ...... G09F 9/301; G06F 1/1652; G06F 1/1616; G09G 3/03–035
See application file for complete search history.

(56) References Cited

U.S. PATENT DOCUMENTS 6,643,124 B1 * 11/2003 Wilk .................. H04M 1/0247
345/169
7,092,247 B2 * 8/2006 Kim ..................... G06F 1/1622
361/679.04

7,620,425 B2 * 11/2009 Ju ...................... H04M 1/0247
D14/371
8,406,826 B2 * 3/2013 Moran ................. H04M 1/725
455/566
8,432,331 B2 * 4/2013 Schilling ............ H04M 1/0247
345/905
8,860,632 B2 * 10/2014 Kilpatrick ........... G06F 3/1446
345/38
8,863,038 B2 * 10/2014 King .................... G06F 1/1684
715/702
8,866,840 B2 * 10/2014 Dahl .................. H04M 1/0247
345/1.3

(Continued)

FOREIGN PATENT DOCUMENTS

KR 10-2019-0036274 A 4/2019

*Primary Examiner* — Patrick F Marinelli
(74) *Attorney, Agent, or Firm* — F. CHAU & ASSOCIATES, LLC

(57) ABSTRACT

A display device includes a first foldable panel including a first flat panel-type display panel having a circular shape or a polygonal shape in a plan view and a second flat panel-type display panel disposed in a folded or unfolded structure with the first flat panel-type display panel and having a plate shape. The first flat panel-type display panel is foldable into a first inner hole area defined in the second flat panel-type display panel. A second foldable panel includes a third flat panel-type display panel having a circular shape or a polygonal shape in the plan view and a fourth flat panel-type display panel disposed in a folded or unfolded structure with the third flat panel-type display panel and having a plate shape. The third flat panel-type display panel is foldable into a second inner hole area defined in the fourth flat panel-type display panel.

20 Claims, 10 Drawing Sheets

(56)         References Cited

U.S. PATENT DOCUMENTS

| | | | | |
|---|---|---|---|---|
| 8,933,874 | B2 * | 1/2015 | Lundqvist | H04M 1/0247 |
| | | | | 345/1.3 |
| 9,618,760 | B2 * | 4/2017 | Cornford | G02B 30/37 |
| 10,215,332 | B2 * | 2/2019 | Lee | G06F 1/1641 |
| 10,444,796 | B2 * | 10/2019 | Manning | G06F 3/1423 |
| 10,642,220 | B2 * | 5/2020 | Zhang | G02B 27/04 |
| 10,789,879 | B1 * | 9/2020 | Iguchi | H05B 45/37 |
| 10,936,015 | B2 * | 3/2021 | Liu | G06F 1/1624 |
| 11,003,214 | B2 * | 5/2021 | Manning | G06F 1/1618 |
| 11,258,890 | B2 * | 2/2022 | Griffith | G03B 21/10 |
| 11,375,628 | B2 * | 6/2022 | Zhang | G06F 1/1616 |
| RE49,193 | E * | 8/2022 | Prushinskiy | G06F 1/1601 |
| 11,435,785 | B2 * | 9/2022 | Song | G06F 1/1652 |
| 11,651,750 | B2 * | 5/2023 | Kim | G09G 5/373 |
| | | | | 345/660 |
| 11,707,671 | B2 * | 7/2023 | Abdelkarim | G09G 3/003 |
| | | | | 463/32 |
| 11,792,311 | B2 * | 10/2023 | Griffith | G03B 21/28 |
| | | | | 455/556.1 |
| 11,934,228 | B2 * | 3/2024 | Jung | G06F 3/0487 |
| 12,167,548 | B2 * | 12/2024 | Igor | G06F 1/1641 |
| 12,256,504 | B2 * | 3/2025 | Lee | G06F 1/1605 |
| RE50,597 | E * | 9/2025 | Prushinskiy | G09G 3/035 |
| 12,431,042 | B2 * | 9/2025 | Yim | G09F 9/301 |
| 2005/0099361 | A1 * | 5/2005 | Majer | G06F 3/1423 |
| | | | | 345/1.3 |
| 2007/0076861 | A1 * | 4/2007 | Ju | H04M 1/0247 |
| | | | | 379/433.01 |

| | | | | |
|---|---|---|---|---|
| 2010/0085274 | A1 * | 4/2010 | Kilpatrick | G06F 1/1641 |
| | | | | 345/1.3 |
| 2010/0085382 | A1 * | 4/2010 | Lundqvist | G06F 3/1438 |
| | | | | 345/659 |
| 2010/0120468 | A1 * | 5/2010 | Moran | H04M 1/725 |
| | | | | 455/556.1 |
| 2011/0126141 | A1 * | 5/2011 | King | H04M 1/0247 |
| | | | | 715/847 |
| 2011/0216064 | A1 * | 9/2011 | Dahl | H04M 1/0247 |
| | | | | 345/428 |
| 2012/0182295 | A1 * | 7/2012 | Schilling | G06F 1/1641 |
| | | | | 345/418 |
| 2013/0127748 | A1 * | 5/2013 | Vertegaal | G06F 3/0485 |
| | | | | 345/173 |
| 2014/0067320 | A1 * | 3/2014 | Lee | G01B 21/20 |
| | | | | 702/167 |
| 2015/0116921 | A1 * | 4/2015 | Hsu | G06F 1/1624 |
| | | | | 361/679.27 |
| 2016/0366772 | A1 * | 12/2016 | Choi | G06F 1/1675 |
| 2017/0038799 | A1 * | 2/2017 | Delaporte | G06F 1/1616 |
| 2018/0317314 | A1 * | 11/2018 | Olberding | G09F 9/301 |
| 2019/0212778 | A1 * | 7/2019 | Wu | G06F 1/1677 |
| 2022/0039273 | A1 * | 2/2022 | Zhang | G06F 1/1616 |
| 2022/0215815 | A1 * | 7/2022 | Kim | G09G 5/14 |
| 2023/0209744 | A1 * | 6/2023 | Lee | G06F 1/1605 |
| | | | | 361/807 |
| 2023/0213972 | A1 * | 7/2023 | Lee | G06F 1/1616 |
| | | | | 361/679.01 |
| 2024/0194096 | A1 * | 6/2024 | Yim | G02F 1/13476 |
| 2025/0098085 | A1 * | 3/2025 | Qian | G04G 17/08 |
| 2025/0264909 | A1 * | 8/2025 | Yim | G06F 1/1616 |

* cited by examiner

DISPLAY DEVICE

CROSS-REFERENCE TO RELATED APPLICATION

This application claims priority under 35 U.S.C. § 119 to Korean Patent Application No. 10-2024-0022538, filed on Feb. 16, 2024 in the Korean Intellectual Property Office, the disclosure of which is incorporated by reference in its entirety herein.

1. TECHNICAL FIELD

The present disclosure relates to a display device.

2. DISCUSSION OF RELATED ART

The demand for display devices for displaying images to a user has increased and diversified along with the development of the information society. For example, display devices have been applied to various consumer electronic devices, such as smartphones, digital cameras, laptop computers, navigation devices, and smart televisions.

The display devices may be flat panel display devices, such as liquid crystal display devices, field emission display devices or organic light emitting display devices. Among such flat panel display devices, a light emitting display device may display an image without needing a backlight unit to provide light to a display panel because each of the pixels of the display panel includes self emissive light emitting elements.

Recently, demand for stereoscopic image display devices that provide a three-dimensional effect to the displayed images has increased. As an example, the display device may implement a binocular parallax method that uses parallax images of left and right eyes to provide a three-dimensional effect on the displayed images. The binocular parallax method is classified into an eyeglasses method that requires the user to wear eyeglasses to visualize the three-dimensional image and a non-eyeglasses method that does not require the user to wear eyeglasses to visualize the three-dimensional image. In addition, a method of additionally forming an optical member in the display device to provide the three-dimensional effect is being developed. Various other methods for displaying images to provide a three-dimensional effect are in development.

SUMMARY

Aspects of embodiments of the present disclosure provide a display device capable of displaying an image having a three-dimensional effect using a plurality of foldable display panels that may be disposed three-dimensionally.

Aspects of embodiments of the present disclosure also provide a display device capable of displaying a three-dimensional image by an assembly structure of foldable panels including a first flat panel-type display panel having a circular or polygonal shape and a second flat panel-type display panel having an inner hole to which the first flat panel-type display panel is coupled in the plan view.

However, aspects of embodiments of the present disclosure are not restricted to those set forth herein. The above and other aspects of the present disclosure will become more apparent to one of ordinary skill in the art to which the present disclosure pertains by referencing the detailed description of embodiments of the present disclosure given below.

According to an embodiment of the present disclosure, a display device includes a first foldable panel including a first flat panel-type display panel having a circular shape or a polygonal shape in a plan view and a second flat panel-type display panel disposed in a folded or unfolded structure with the first flat panel-type display panel and having a plate shape in the plan view. The first flat panel-type display panel is foldable into a first inner hole area defined in the second flat panel-type display panel. A second foldable panel includes a third flat panel-type display panel having a circular shape or a polygonal shape in the plan view and a fourth flat panel-type display panel disposed in a folded or unfolded structure with the third flat panel-type display panel and having a plate shape in the plan view. The third flat panel-type display panel is foldable into a second inner hole area defined in the fourth flat panel-type display panel.

In an embodiment, one end of the first flat panel-type display panel is secured to a first folding module disposed at one end of the second flat panel-type display panel, and a rear surface of the first flat panel-type display panel is foldable into or unfoldable from the first inner hole area.

In an embodiment, the first flat panel-type display panel has a circular shape, a triangular shape, a quadrangular shape, a pentagonal shape or a hexagonal shape in the plan view.

In an embodiment, the first flat panel-type display panel is foldable into the first inner hole area. The first flat panel-type display panel is coupled to the second flat panel-type display panel in a plate shape in the plan view when folded into the first inner hole area. First and second image display surfaces of the first and second flat panel-type display panels are disposed towards a same direction in the plate shape in the plan view when the first flat panel-type display panel is folded into the first inner hole area. The first flat panel-type display panel is unfolded toward the one end by the first folding module.

According to an embodiment of the disclosure, a display device includes a first foldable panel including a first flat panel-type display panel having a circular shape, a triangular shape, a quadrangular shape, a pentagonal shape or a hexagonal shape in a plan view and a second flat panel-type display panel having a plate shape in the plan view. The first flat panel-type display panel is foldable into or unfoldable from a first inner hole area defined in the second flat panel-type display panel. A second foldable panel includes a third flat panel-type display panel having a circular shape, a triangular shape, a quadrangular shape, a pentagonal shape or a hexagonal shape in the plan view and a fourth flat panel-type display panel having a plate shape in the plan view. The third flat panel-type display panel is foldable into or unfoldable from a second inner hole area defined in the fourth panel-type display panel. The first and third flat panel-type display panels have a same shape as each other. The first inner hole area is formed in a shape corresponding to an outline shape and a size in the plan view of the first flat panel-type display panel at a center portion of a front surface including one end of the second flat panel-type display panel.

With a display device according to embodiments, it is possible to display an image having a three-dimensional effect in a non-eyeglasses state using a plurality of foldable display panels that may be disposed three-dimensionally.

In addition, by displaying an image having a three-dimensional effect by an assembly structure of foldable display panels, it is possible to increase stereoscopic image display efficiency and increase utilization of the display device at a low cost.

The effects of embodiments of the present disclosure are not limited to the aforementioned effects, and various other effects are included in the present specification.

BRIEF DESCRIPTION OF THE DRAWINGS

The above and other aspects and features of the present disclosure will become more apparent by describing in detail non-limiting embodiments thereof with reference to the attached drawings, in which:

FIG. 10 is a perspective view illustrating a display device according to an embodiment of the present disclosure.

DETAILED DESCRIPTION OF EMBODIMENTS

The present disclosure will now be described more fully hereinafter with reference to the accompanying drawings, in which non-limiting embodiments of the disclosure are shown. This disclosure may, however, be embodied in different forms and should not be construed as limited to the described embodiments set forth herein.

It will also be understood that when a layer is referred to as being "on" another layer or substrate, it can be directly on the other layer or substrate, or intervening layers may also be present. When a layer is referred to as being "directly on" another layer or substrate, no intervening elements may be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

Each of the features of the various embodiments of the present disclosure may be combined or combined with each other, in part or in whole, and technically various interlocking and driving are possible. Each embodiment may be implemented independently of each other or may be implemented together in an association.

Hereinafter, non-limiting embodiments will be described with reference to the accompanying drawings.

Figure 1:
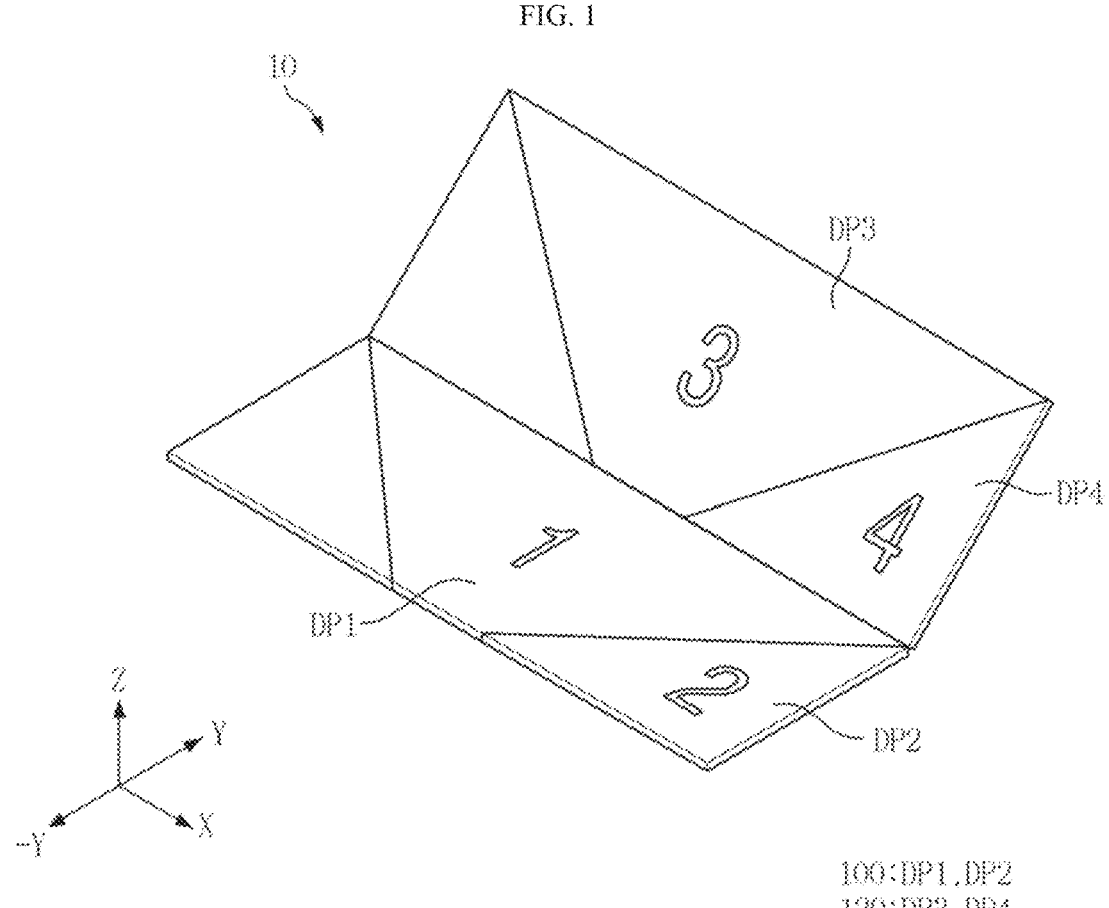
FIG. 1 is a perspective view illustrating a display device according to an embodiment of the present disclosure.

FIG. 1 is a perspective view illustrating a display device according to an embodiment of the present disclosure.

A display device 10 according to an embodiment of the present disclosure may be applied to portable electronic devices such as tablet personal computers (PCs), portable multimedia players (PMPs), ultra mobile PCs (UMPCs), electronic books, electronic notebooks, mobile phones, smartphones, and mobile communication terminals. In addition, the display device 10 according to an embodiment may be applied as a display unit of televisions, laptop computers, monitors, billboards, or the Internet of Things (IOT). However, embodiments of the present disclosure are not necessarily limited thereto and the display device 10 may be applied to various different small, medium or large-sized electronic devices.

Referring to FIG. 1, the display device according to an embodiment includes a first foldable panel 100 including a first flat panel-type display panel DP1 and a second flat panel-type display panel DP2 and a second foldable panel 120 including a third flat panel-type display panel DP3 and a fourth flat panel-type display panel DP4.

In an embodiment, the first foldable panel 100 includes a first flat panel-type display panel DP1 having a circular shape or a polygonal shape in a plan view (e.g., in a plane defined in the X-axis and Y-axis directions when in an unfolded state) and a second flat panel-type display panel DP2 foldably bound to (e.g., secured to) the first flat panel-type display panel DP1.

In an embodiment, the first flat panel-type display panel DP1 of the first foldable panel 100 may be formed in a circular shape or a polygonal shape in the plan view. An embodiment in which the first flat panel-type display panel DP1 is formed in a quadrangular shape, which is a rhombic shape, in the plan view, has been illustrated in FIG. 1. However, embodiments of the present disclosure are not necessarily limited thereto and a shape of the first flat panel-type display panel DP1 in the plan view may vary. For example, in an embodiment the first flat panel-type display panel DP1 may be formed in a circular shape in the plan view or formed in a polygonal shape such as a triangular shape, a quadrangular shape, or a pentagonal shape in the plan view.

Figure 4:
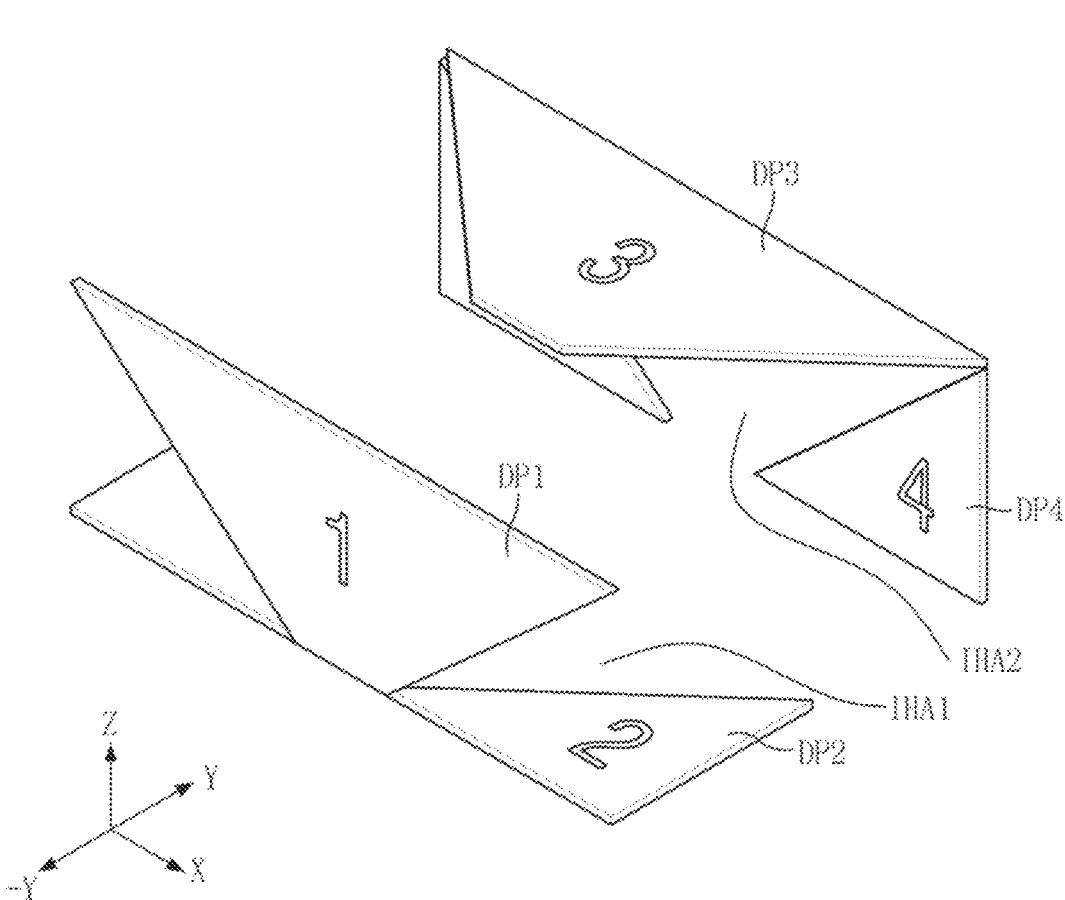
FIG. 4 is a perspective view illustrating an unfolded form and a separated structure of each of first and second foldable panels illustrated in FIG. 1 according to an embodiment of the present disclosure.
Figure 5:
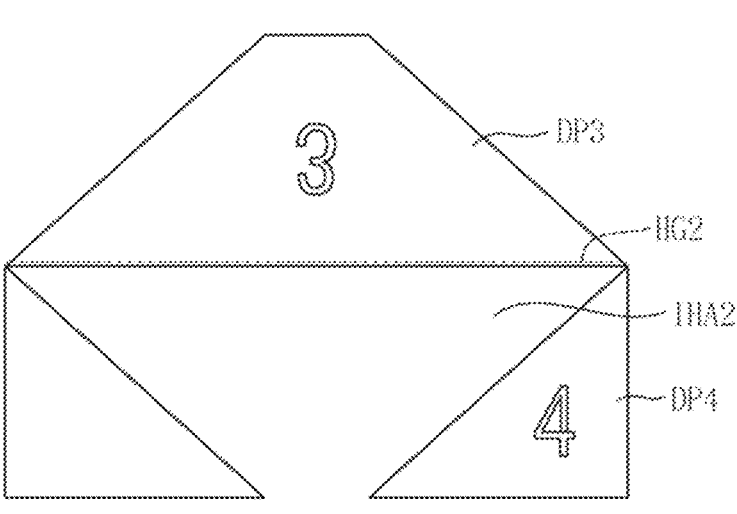
FIG. 5 is a plan view illustrating a planar unfolded structure of each of the first and second foldable panels illustrated in FIG. 4 according to an embodiment of the present disclosure.
Figure 5:
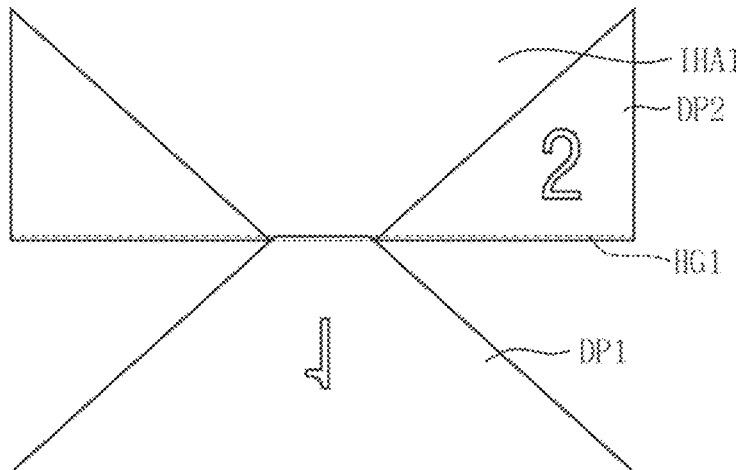
Figure 5:
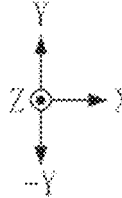

In an embodiment, one end of the first flat panel-type display panel DP1 is assembled to (e.g., secured to) a first folding module (e.g., HG1; FIG. 5) disposed at one end of the second flat panel-type display panel DP2, and a rear surface of the first flat panel-type display panel DP1 is folded into (e.g., foldable into) or unfolded from (e.g., unfoldable from) an inner hole area (IHA1; FIGS. 4-5) defined in the second flat panel-type display panel DP2. For example, in an embodiment the second flat panel-type display panel DP2 may have two surfaces formed at opposite ends (e.g., in the X-axis direction) with an inner hole area, such as a first inner hole area IHA1 formed of empty space, disposed therebetween.

Referring to FIG. 1, in an embodiment the first flat panel-type display panel DP1 may be folded in a Y-axis direction, and the rear surface of the first flat panel-type display panel DP1 may be coupled to the inner hole area (IHA1; FIGS. 4-5) of the second flat panel-type display panel DP2. In an embodiment, the inner hole area of the second flat panel-type display panel DP2 may be formed in a groove shape having a rear surface that is closed by a rear surface cover or formed in a hole shape having a rear surface that is opened.

When the first and second flat panel-type display panels DP1 and DP2 are folded and coupled to each other, the rear surface of the first flat panel-type display panel DP1 is folded into the inner hole area formed in the second flat panel-type display panel DP2. Accordingly, the first and second flat panel-type display panels DP1 and DP2 may be bound to (e.g., secured to) each other in a plate shape in the plan view. In addition, in an embodiment first and second image display surfaces of the first and second flat panel-type display panels DP1 and DP2 may be disposed identically towards a Z-axis direction in a plate shape in the plan view. Conversely, in an embodiment the first flat panel-type display panel DP1 may be unfolded in the Z-axis direction and a −Y-axis direction opposite to the Y-axis direction so that the plate shape is not formed in the first foldable panel 100.

In an embodiment, the second flat panel-type display panel DP2 of the first foldable panel 100 is formed in a circular shape or a polygonal shape in the plan view, and the inner hole area having a shape corresponding to an outline shape and a size (e.g., an area) in the plan view of the first flat panel-type display panel DP1 is formed at a center portion of a front surface including the one side surface (e.g., the first side surface) of the second flat panel-type display panel DP2.

As an example, in an embodiment the second flat panel-type display panel DP2 may be formed in a shape such as a rectangular shape, a square shape, a circular shape, or an elliptical shape in the plan view. For example, the second flat panel-type display panel DP2 may be formed in a rectangular shape in the plan view, having relatively long sides formed in a transverse direction which is an X-axis direction. However, embodiments of the present disclosure are not necessarily limited thereto, and the relatively long sides may be positioned in a longitudinal direction or the second flat panel-type display panel DP2 may be rotatably installed, such that the relatively long sides may be variably positioned in the transverse or longitudinal direction.

In an embodiment, a second image display surface of the second flat panel-type display panel DP2 is formed in at least one side surface direction (e.g., a lateral side surface in the X direction) of the inner hole area so as to surround the at least one side surface of the inner hole area.

Depending on a shape of the second flat panel-type display panel DP2 in the plan view and a shape in the plan view of the inner hole area corresponding to the first flat panel-type display panel DP1, the second image display surfaces having a semicircular shape, a columnar or cylindrical shape, or a polygonal shape such as a triangular shape or a quadrangular shape in the plan view may be formed in a front surface direction of the second flat panel-type display panel DP2.

As illustrated in FIG. 1, in an embodiment in which the second flat panel-type display panel DP2 is formed in a rectangular shape in the plan view and the first flat panel-type display panel DP1 and the corresponding inner hole area are formed in a rhombic shape, the second image display surfaces having a right triangle shape are formed in the second flat panel-type display panel DP2. For example, one or both of the right triangle-shaped surfaces formed at opposite ends of the second flat panel-type display panel DP2 (e.g. in the X-axis direction) may be a second image display surface. In an embodiment in which the second flat panel-type display panel DP2 is formed in a rectangular shape in the plan view and the first flat panel-type display panel DP1 and the corresponding inner hole area are formed in a square shape, the second image display surfaces may be formed in at least one quadrangular shape in the second flat panel-type display panel DP2.

In an embodiment in which the second flat panel-type display panel DP2 is disposed in a shape such as a rectangular shape or a square shape in the plan view, the first flat panel-type display panel DP1 and the corresponding inner hole area of the second flat panel-type display panel DP2 may also be formed in a circular shape in the plan view. In this embodiment, the second image display surfaces having a polygonal shape in which a concave curved line and straight lines are combined with each other may be formed in the second flat panel-type display panel DP2.

In an embodiment, the second foldable panel 120 includes a third flat panel-type display panel DP3 having a circular shape or a polygonal shape in the plan view and a fourth flat panel-type display panel DP4 foldably bound to (e.g., secured to) the third flat panel-type display panel DP3.

In an embodiment, the third flat panel-type display panel DP3 of the second foldable panel 120 may be formed in a circular shape or a polygonal shape in the plan view. An embodiment in which the third flat panel-type display panel DP3 is formed in a quadrangular shape, which is a rhombic shape, in the plan view, has been illustrated in FIG. 1. However, embodiments of the present disclosure are not necessarily limited thereto and the third flat panel-type display panel DP3 may be formed in a circular shape in the plan view or formed in a polygonal shape such as a triangular shape, a quadrangular shape, or a pentagonal shape in the plan view.

In an embodiment, an end of the third flat panel-type display panel DP3 is assembled to (e.g., secured to) a second folding module (e.g., HG2; FIG. 5) formed at the an end of the fourth flat panel-type display panel DP4, and a rear surface of the third flat panel-type display panel DP3 is foldable into or unfoldable from an inner hole area, such as a second inner hole area IHA2 defined in the fourth flat panel-type display panel DP4. For example, in an embodiment the fourth flat panel-type display panel DP4 may have two surfaces formed at opposite ends (e.g., in the X-axis direction) with an inner hole area, such as the second inner hole area IHA2 (FIGS. 4-5) formed of empty space, disposed therebetween.

Referring to FIG. 1, in an embodiment the third flat panel-type display panel DP3 may be folded in the −Y-axis direction, and the rear surface of the third flat panel-type display panel DP3 may be coupled to an inner portion of the inner hole area defined in the fourth flat panel-type display panel DP4.

When the third and fourth flat panel-type display panels DP3 and DP4 are folded and coupled to each other, the third and fourth flat panel-type display panels DP3 and DP4 may be bound to each other (e.g., secured to each other) in a plate shape in the plan view. For example, in an embodiment third and fourth image display surfaces of the third and fourth flat panel-type display panels DP3 and DP4 may be disposed identically towards the Z-axis direction or the like in a plate shape in the plan view. Conversely, the third flat panel-type display panel DP3 may be unfolded in the Z-axis direction and the Y-axis direction opposite to the −Y-axis direction so that the second foldable panel 120 does not form the plate shape.

In an embodiment, the fourth flat panel-type display panel DP4 of the second foldable panel 120 is formed in a circular shape or a polygonal shape in the plan view, and the inner hole area, such as the second inner hole area IHA2, having a shape corresponding to an outline shape and a size (e.g., an area) in the plan view of the third flat panel-type display panel DP3 is formed at a center portion of a front surface including the other side surface of the fourth flat panel-type display panel DP4.

In an embodiment, a shape in the plan view and a size (e.g., an area) in the plan view of the fourth flat panel-type display panel DP4 are the same as a shape in the plan view and a size (e.g., an area) in the plan view of the second flat panel-type display panel DP2. For example, the fourth flat panel-type display panel DP4 may be formed in a shape such as a rectangular shape, a square shape, a circular shape, or an elliptical shape in the plan view. For example, in an embodiment the fourth flat panel-type display panel DP4 may be formed in a rectangular shape, in the plan view, having relatively long sides formed in the transverse direction, which is the X-axis direction.

A fourth image display surface of the fourth flat panel-type display panel DP4 is formed in at least one side surface direction of the inner hole area so as to surround at least one side surface of the inner hole area such as the second inner hole area IHA2, formed at a central portion of the fourth flat panel-type display panel DP4. For example, one or both of the right triangle-shaped surfaces formed at opposite ends of the fourth flat panel-type display panel DP4 (e.g. in the X-axis direction) may be a fourth image display surface.

Based on a shape of the fourth flat panel-type display panel DP4 in the plan view and a shape in the plan view of the inner hole area corresponding to the third flat panel-type display panel DP3, the fourth image display surfaces having a semicircular shape, a columnar or cylindrical shape, or a polygonal shape such as a triangular shape or a quadrangular shape in the plan view may be formed in a front surface direction of the fourth flat panel-type display panel DP4.

As illustrated in FIG. 1, in an embodiment in which the fourth flat panel-type display panel DP4 is formed in a rectangular shape in the plan view and the third flat panel-type display panel DP3 and the inner hole area, such as the second inner hole area IHA2, are formed in a rhombic shape, the fourth image display surfaces having a right triangle shape are formed in the fourth flat panel-type display panel DP4. In an embodiment in which the fourth flat panel-type display panel DP4 is formed in a rectangular shape in the plan view and the third flat panel-type display panel DP3 and the corresponding inner hole area, such as the second inner hole area IHA2, are formed in a square shape, the fourth image display surfaces may be formed in at least one quadrangular shape in the fourth flat panel-type display panel DP4.

In an embodiment in which the fourth flat panel-type display panel DP4 is disposed in a shape such as a rectangular shape or a square shape in the plan view, the third flat panel-type display panel DP3 and the inner hole area may also be formed in a circular shape in the plan view. In this embodiment, the fourth image display surfaces having a shape in which a concave curved line and straight lines are combined with each other may be formed in the fourth flat panel-type display panel DP4.

The first and second flat panel-type display panels DP1 and DP2 of the first foldable panel 100 and the third and fourth flat panel-type display panels DP3 and DP4 of the second foldable panel 120 may be variously classified depending on a display method. For example, in an embodiment the first and second flat panel-type display panels DP1 and DP2 and the third and fourth flat panel-type display panels DP3 and DP4 may be classified and configured into micro light emitting diode (LED) display panels, nano LED display panels, liquid crystal display panels, plasma display panels, field emission display panels, electrophoretic display panels, organic light emitting diode display panels, inorganic light emitting display panels, quantum dot light emitting display panels, and the like. Hereinafter, for convenience of explanation, organic light emitting diode display panels will be described as examples of the first and second flat panel-type display panels DP1 and DP2 and the third and fourth flat panel-type display panels DP3 and DP4 according to an embodiment, and unless special distinction is required, the organic light emitting diode display panels used in an embodiment will be abbreviated as the first and second flat panel-type display panels DP1 and DP2 and the third and fourth flat panel-type display panels DP3 and DP4. However, the first and second flat panel-type display panels DP1 and DP2 and the third and fourth flat panel-type display panels DP3 and DP4 according to an embodiment are not necessarily limited to the organic light emitting diode display panels, and may be other display devices listed above or known in the art without departing from the present disclosure.

Figure 2:
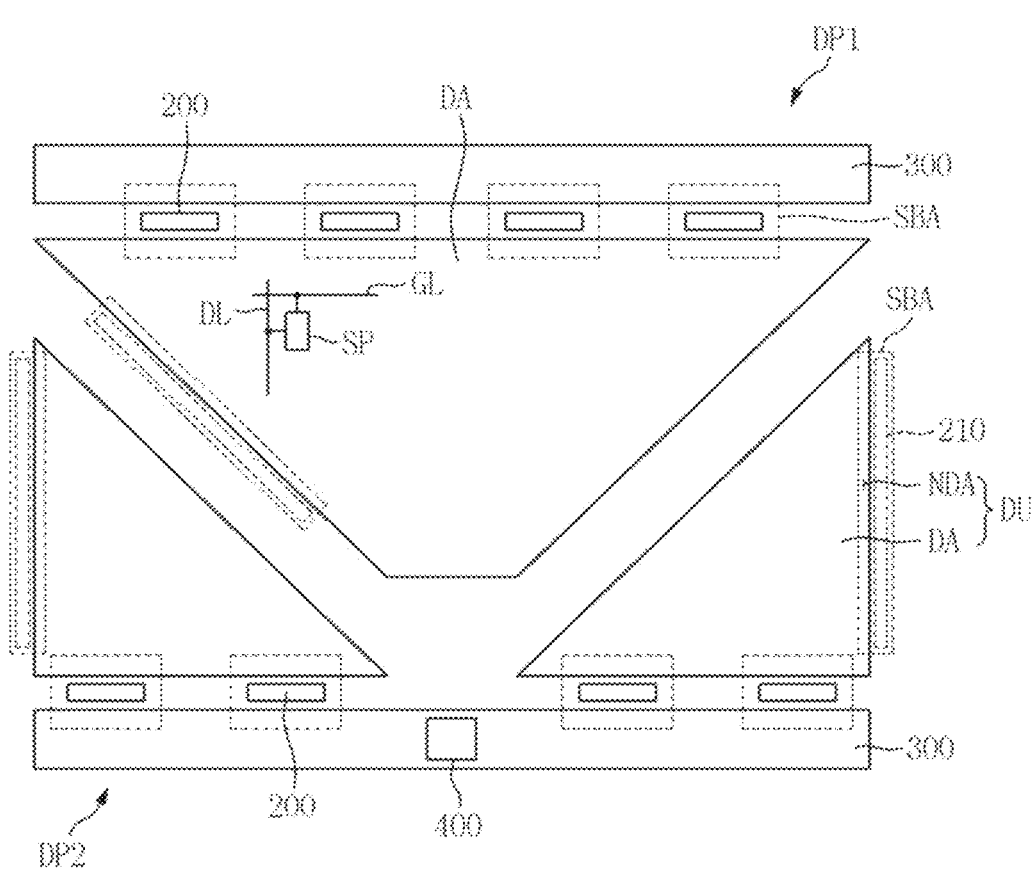
FIG. 2 is a block diagram illustrating detailed components of a first foldable panel illustrated in FIG. 1 according to an embodiment of the present disclosure.
Figure 2:

FIG. 2 is a block diagram illustrating detailed components of a first foldable panel illustrated in FIG. 1. FIG. 2 is a block diagram specifically illustrating detailed components constituting the first and second flat panel-type display panels DP1 and DP2 illustrated in FIG. 1. In addition, FIG. 3 is a side cross-sectional view specifically illustrating a second display panel illustrated in FIG. 2.

Figure 3:
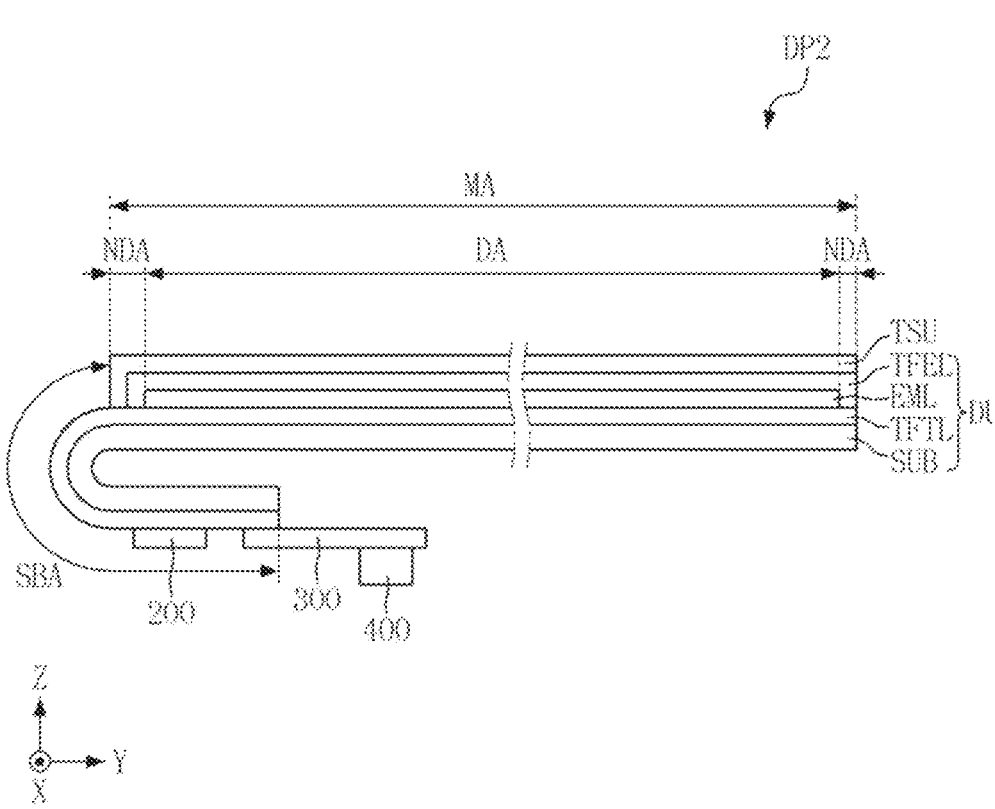
FIG. 3 is a side cross-sectional view specifically illustrating a second display panel illustrated in FIG. 2 according to an embodiment of the present disclosure.

Referring to FIGS. 2 and 3, in an embodiment each display panel (e.g., each of the first and second flat panel-type display panels DP1 and DP2) includes at least one image display surface DA, a touch sensing unit TSU, a scan driving circuit 210, a data driving circuit 200, and a display driving circuit 400. In an embodiment, the display driving circuit 400 may be formed only in any one of the first and second flat panel-type display panels DP1 and DP2.

As an example, in an embodiment the image display surface DA of the first flat panel-type display panel DP1 may be formed in a front surface direction of a display unit DU, and may include a plurality of pixels SP and display an image through the plurality of pixels SP.

In an embodiment, the touch sensing unit TSU sensing a touch by a human body part such as a finger, an electronic pen, and the like, may be disposed on the image display surface DA. The touch sensing unit TSU may be mounted on a front surface portion of the image display surface DA or formed integrally with the image display surface DA. In an embodiment, such a touch sensing unit TSU may include a plurality of touch electrodes and sense a user's touch in a capacitive manner using the touch electrodes.

The scan driving circuit 210 supplies gate scan signals to pixels SP for each horizontal line through gate lines GL for each horizontal line of the image display surface DA in response to a gate control signal from the display driving circuit 400. The scan driving circuit 210 sequentially drives the pixels SP for each horizontal line by sequentially supplying the gate scan signals to the gate lines GL for each horizontal line.

In an embodiment, the data driving circuit 200 may include a plurality of data driving integrated circuits. The data driving circuit 200 outputs data voltages according to image data to the pixels SP of the image display surface DA based on a data driving control signal from the display driving circuit 400. In an embodiment, the data driving integrated circuits may supply the data voltages to data lines DL to which the respective pixels SP are connected, in horizontal line units every horizontal cycle.

The display driving circuit 400 may operate as a main processor or may be formed integrally with a main processor. Accordingly, the display driving circuit 400 may control overall functions of the first and second flat panel-type display panels DP1 and DP2. For example, in an embodiment the display driving circuit 400 sorts external image data and supplies the sorted image data to the data driving integrated circuits of the data driving circuit 200, and controls a driving timing of the data driving circuit 200. In addition, the display driving circuit 400 controls a gate scan signal output timing of the scan driving circuit 210. In addition, the display driving circuit 400 generates data control signals to control data voltage output timings of the data driving integrated circuits included in the data driving circuit 200.

In an embodiment, the display driving circuit 400 may detect touch coordinate information included in touch data of the touch sensing unit TSU and then generate digital image data according to the touch coordinate information. In addition, the display driving circuit 400 may execute an application indicated by an icon displayed at user's touch coordinates. As another example, the display driving circuit 400 may receive coordinate data from an electronic pen or the like, decide touch coordinates of the electronic pen, and then generate digital image data according to the touch coordinates or execute an application indicated by an icon displayed at the touch coordinates of the electronic pen.

Referring to FIG. 3, the first flat panel-type display panel DP1 may be divided into a main area MA and a sub-area SBA. The main area MA may include an image display surface DA including the pixels SP displaying an image and a non-display area NDA disposed around the image display surface DA (e.g., in the X-axis and Y-axis directions). In the image display surface DA, an image may be displayed by emitting light from emission areas or opening areas of the respective pixels SP. In an embodiment, the pixels SP of the image display surface DA may include pixel circuits including switching elements, a pixel defining film defining the emission areas or the opening areas, and self-light emitting elements.

The non-display area NDA may be any one outside area or outer area of the image display surface DA (e.g., in the X-axis and/or Y-axis directions). The non-display area NDA may be defined as an edge area of the main area MA of the first flat panel-type display panel DP1. In an embodiment, fan-out lines connecting the scan driving circuit 210, the data driving circuit 200, and the display driving circuit 400 to the image display surface may be formed in the non-display area NDA.

The sub-area SBA may extend from one side of the main area MA. In an embodiment, the sub-area SBA may be formed as a film made of a flexible material that may be bent, folded, and rolled. For example, when the sub-area SBA is bent, the sub-area SBA may overlap the main area MA in a thickness direction (e.g., the Z-axis direction). In an embodiment, the sub-area SBA may include the data driving circuit 200 and pad parts connected to a circuit board 300. However, embodiments of the present disclosure are not necessarily limited thereto. For example, in an embodiment the sub-area SBA may be omitted, and the data driving circuit 200 and the pad parts may be disposed in the non-display area NDA.

In an embodiment, the data driving circuit 200 may be formed as a plurality of integrated circuits (ICs) and mounted on the respective display panels DP1 and DP2 in a chip on glass (COG) manner, a chip on plastic (COP) manner, or an ultrasonic bonding manner. As an example, the data driving circuit 200 may be disposed in the sub-area SBA, and may overlap the main area MA in the thickness direction (e.g., the Z-axis direction) by bending of the sub-area SBA. As another example, the data driving circuit 200 may be mounted on the circuit board 300.

In an embodiment, the circuit board 300 may be electrically connected to the pad parts of the display unit DU by an anisotropic conductive film (ACF). For example, lead lines of the circuit board 300 may be electrically connected to the pad parts of the display unit DU. In an embodiment, the circuit board 300 may be a flexible printed circuit board, a printed circuit board, or a flexible film such as a chip on film.

In an embodiment, the display driving circuit 400 may be mounted on the circuit board 300. For example, the display driving circuit 400 may be formed as an integrated circuit (IC).

FIG. 4 is a perspective view illustrating an unfolded form and a separated structure of each of first and second foldable panels illustrated in FIG. 1.

Referring to FIG. 4, an end of the first foldable panel 100 may be bound to (e.g., secured to) or separated from one end of the second foldable panel 120. For example, in an embodiment the first and second flat panel-type display panels DP1 and DP2 of the first foldable panel 100 may be separated from the third and fourth flat panel-type display panels DP3 and DP4 of the second foldable panel 120. Accordingly, the first foldable panel 100 and the second foldable panel 120 may be applied to a flat panel-type display device in a separated state.

In an embodiment, the first flat panel-type display panel DP1 is bound and assembled to (e.g., secured to) one end of the second flat panel-type display panel DP2 by the first folding module (e.g., HG1; FIG. 5). Accordingly, the first flat panel-type display panel DP1 may be unfolded in the −Y-axis direction in a state in which one end thereof is bound by the first folding module, and the rear surface of the first flat panel-type display panel DP1 may be separated from the inner hole area, such as the first inner hole area IHA1, of the second flat panel-type display panel DP2.

In an embodiment, the first flat panel-type display panel DP1 is unfolded in the Z-axis direction according to a disposition direction of the first folding module, such that the first flat panel-type display panel DP1 may be disposed and maintained at an angle of 90° with respect to the second flat panel-type display panel DP2.

In an embodiment, one end of the second foldable panel 120 may be bound to or separated from the other end of the first foldable panel 100. For example, in an embodiment the third and fourth flat panel-type display panels DP3 and DP4 of the second foldable panel 120 may be separated from the first and second flat panel-type display panels DP1 and DP2 of the first foldable panel 100. The first foldable panel 100 and the second foldable panel 120 may be applied to the flat panel-type display device in the separated state.

In an embodiment, the third flat panel-type display panel DP3 is bound and assembled to (e.g., secured to) an end of the fourth flat panel-type display panel DP4 by the second folding module (e.g., HG2; FIG. 5). Accordingly, the third flat panel-type display panel DP3 may be unfolded in the Z-axis direction and the Y-axis direction in a state in which the end thereof is bound by the second folding module, and the rear surface of the third flat panel-type display panel DP3 may be separated from the inner hole area, such as the second inner hole area IHA2, of the fourth flat panel-type display panel DP4.

In an embodiment, the third flat panel-type display panel DP3 is unfolded in the Z-axis direction and the Y-axis direction according to a disposition direction of the second folding module, such that the third flat panel-type display panel DP3 may be disposed and maintained at an angle of 90° with respect to the fourth flat panel-type display panel DP4.

FIG. 5 is a plan view illustrating a planar unfolded structure of each of the first and second foldable panels illustrated in FIG. 4.

Referring to FIG. 5, the first flat panel-type display panel DP1 may be unfolded in the Z-axis direction and the –Y-axis direction in a state in which one end thereof is bound by (e.g., secured to) the first folding module HG1, and the rear surface of the first flat panel-type display panel DP1 may be separated from the inner hole area, such as the first inner hole area IHA1, of the second flat panel-type display panel DP2.

In an embodiment, the first flat panel-type display panel DP1 is unfolded in the Z-axis direction and the –Y-axis according to a disposition direction of the first folding module, such that the first flat panel-type display panel DP1 may be disposed and maintained at an angle of 180° with respect to the second flat panel-type display panel DP2.

In addition, the third flat panel-type display panel DP3 is bound and assembled to (e.g., secured to) an end of the fourth flat panel-type display panel DP4 by the second folding module HG2. Accordingly, in an embodiment the third flat panel-type display panel DP3 may be unfolded in the Z-axis direction and the Y-axis direction in a state in which the end thereof is bound by the second folding module, and the rear surface of the third flat panel-type display panel DP3 may be separated from the inner hole area, such as the second inner hole area IHA2, of the fourth flat panel-type display panel DP4.

In an embodiment, the third flat panel-type display panel DP3 is unfolded in the Z-axis direction and the Y-axis direction according to a disposition direction of the second folding module HG2, such that the third flat panel-type display panel DP3 may be disposed and maintained at an angle of 180° with respect to the fourth flat panel-type display panel DP4.

Figure 6:
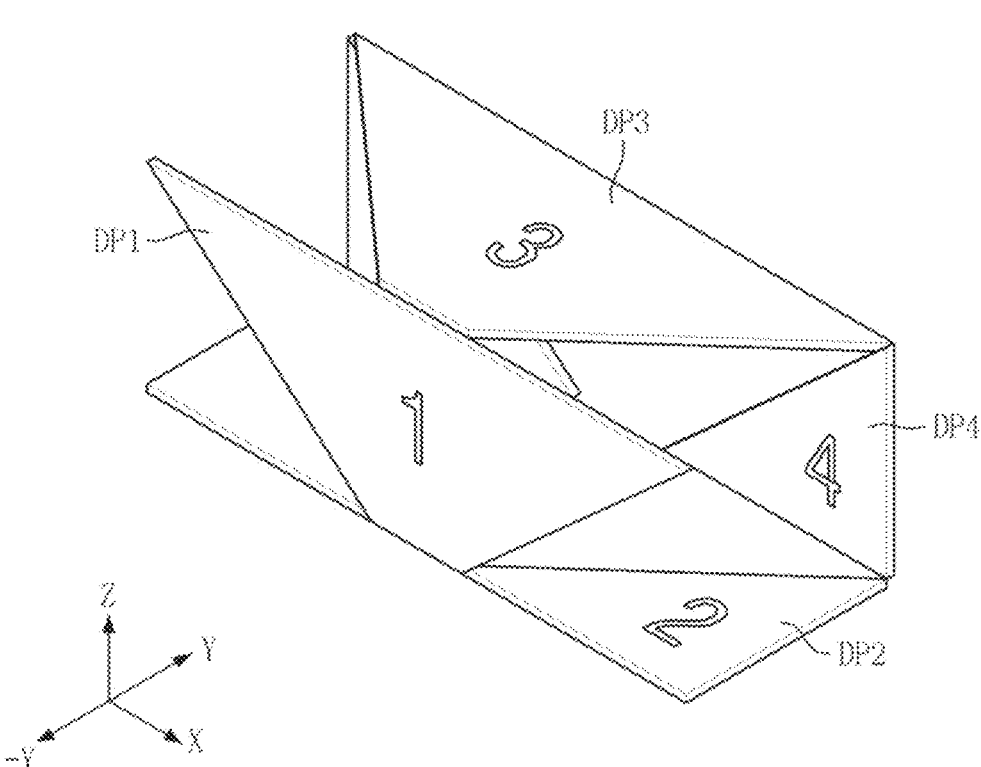
FIG. 6 is a perspective view illustrating a three-dimensional disposition and assembly structure of the first and second foldable panels illustrated in FIGS. 4 and 5 according to an embodiment of the present disclosure.

FIG. 6 is a perspective view illustrating a three-dimensional disposition and assembly structure of the first and second foldable panels illustrated in FIGS. 4 and 5. In addition, FIG. 7 is a side view of the first and second foldable panels disposed and assembled in a three-dimensional shape.

Figure 7:
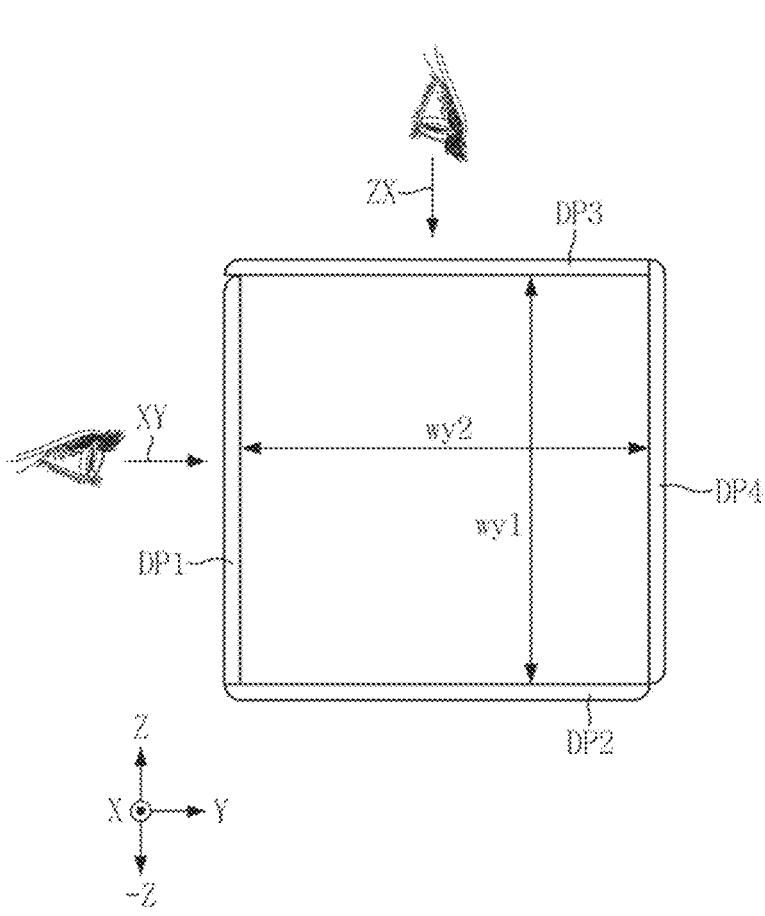
FIG. 7 is a side view of the first and second foldable panels disposed and assembled in a three-dimensional shape according to an embodiment of the present disclosure.

Referring to FIGS. 6 and 7, in an embodiment the first flat panel-type display panel DP1 may be unfolded along the Z-axis direction and the –Y-axis direction in a state in which one end thereof is bound by (e.g., secured to) the first folding module HG1, and the rear surface of the first flat panel-type display panel DP1 may be separated from the inner hole area, such as the first inner hole area IHA1, of the second flat panel-type display panel DP2.

In an embodiment, the first flat panel-type display panel DP1 is unfolded in the Z-axis direction and the –Y-axis according to a disposition direction of the first folding module HG1, such that the first flat panel-type display panel DP1 may be disposed and maintained at an angle of 90° with respect to the second flat panel-type display panel DP2. For example, in an embodiment a relatively short side of the first flat panel-type display panel DP1 is unfolded in the Z-axis direction according to the disposition direction of the first folding module HG1 in a state in which a relatively short side of the second flat panel-type display panel DP2 is disposed in the Y-axis direction, such that the first flat panel-type display panel DP1 and the second flat panel-type display panel DP2 may be disposed and maintained at an angle of 90° with respect to each other.

In an embodiment, the third flat panel-type display panel DP3 may be unfolded along the Z-axis direction and the Y-axis direction in a state in which the end thereof is bound by (e.g., secured to) the second folding module HG2, and the rear surface of the third flat panel-type display panel DP3 may be separated from the inner hole area, such as the second inner hole area IHA2, of the fourth flat panel-type display panel DP4.

In an embodiment, the third flat panel-type display panel DP3 is unfolded in the Z-axis direction and the Y-axis direction according to a disposition direction of the second folding module HG2, such that the third flat panel-type display panel DP3 may be disposed and maintained at an angle of 90° with respect to the fourth flat panel-type display panel DP4. For example, a relatively short side of the third flat panel-type display panel DP3 is unfolded in the Z-axis direction according to the disposition direction of the second folding module HG2 in a state in which a relatively short side of the fourth flat panel-type display panel DP4 is disposed in the Y-axis direction, such that the third flat panel-type display panel DP3 and the fourth flat panel-type display panel DP4 may be disposed and maintained at an angle of 90° with respect to each other.

Referring to FIGS. 6 and 7, in an embodiment one end of the first flat panel-type display panel DP1 disposed and maintained at the angle of 90° is bound to (e.g., secured to) an end of the third flat panel-type display panel DP3 disposed and maintained at the angle of 90°. In addition, an end of the second flat panel-type display panel DP2 disposed and maintained at the angle of 90° may be bound to one end of the fourth flat panel-type display panel DP4 disposed and maintained at the angle of 90°.

Accordingly, the first flat panel-type display panel DP1 and the fourth flat panel-type display panel DP4 may be disposed in parallel with each other in any one direction such as a relatively long side direction, and the second flat panel-type display panel DP2 and the third flat panel-type display panel DP3 may also be disposed in parallel with each other in any one direction such as the relatively long side direction.

In an embodiment, the second flat panel-type display panel DP2 and the third flat panel-type display panel DP3 may be maintained and disposed at a first interval wy1 from each other (e.g., in the Z-axis direction) corresponding to a length of each of the first flat panel-type display panel DP1 and the fourth flat panel-type display panel DP4 in a relatively short side direction.

In addition, in an embodiment the first flat panel-type display panel DP1 and the fourth flat panel-type display panel DP4 may be maintained and disposed at a second interval wy2 from each other (e.g., in the Y-axis direction) corresponding to a length of each of the second flat panel-type display panel DP2 and the third flat panel-type display panel DP3 in the relatively short side direction.

The first image display surface of the first flat panel-type display panel DP1 and the fourth image display surface of the fourth flat panel-type display panel DP4 are disposed towards a direction such as the same side surface direction (e.g., a same first direction, such as the –Y direction). In contrast, the second image display surface of the second flat panel-type display panel DP2 and the third image display surface of the third flat panel-type display panel DP3 may be disposed identically towards a direction different from the first and fourth image display surfaces by 90° (e.g., a same second direction, such as the Z-axis direction).

Figure 8:
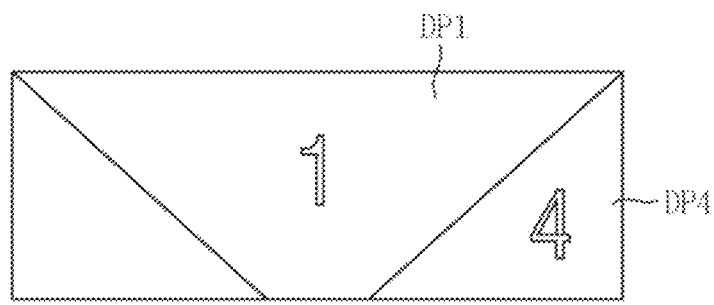
FIG. 8 is a front view illustrating image display surfaces of first and fourth display panels viewed in a sight line of an XY arrow direction of FIG. 7 according to an embodiment of the present disclosure.
Figure 8:
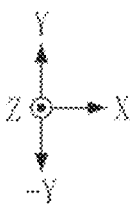

FIG. 8 is a front view illustrating image display surfaces of first and fourth display panels viewed in a sight line of an XY arrow direction of FIG. 7.

Referring to FIG. 8, in an embodiment in which one end of the first flat panel-type display panel DP1 disposed and maintained at the angle of 90° is bound to (e.g. secured to) an end of the third flat panel-type display panel DP3 disposed and maintained at the angle of 90° and an end of the second flat panel-type display panel DP2 disposed and maintained at the angle of 90° is bound to (e.g., secured to) one end of the fourth flat panel-type display panel DP4 disposed and maintained at the angle of 90°, the first flat panel-type display panel DP1 and the fourth flat panel-type display panel DP4 may be disposed in parallel with each other in any one direction such as the relatively long side direction.

The first flat panel-type display panel DP1 and the fourth flat panel-type display panel DP4 are maintained and disposed at the second interval wy2 (e.g., in the Y-axis direction) corresponding to the length of each of the second flat panel-type display panel DP2 and the third flat panel-type display panel DP3 in the relatively short side direction while being disposed in parallel with each other in any one direction such as the relatively long side direction.

The second interval wy2 is also maintained between the first image display surface of the first flat panel-type display panel DP1 and the fourth image display surface of the fourth flat panel-type display panel DP4 by the second interval wy2 (e.g., in the Y-axis direction) between the first flat panel-type display panel DP1 and the fourth flat panel-type display panel DP4. Accordingly, a three-dimensional effect occurs depending on a distance difference (e.g., in the Y-axis direction) between a first display image of the first image display surface and a fourth display image of the fourth image display surface. For example, in a sight line of an XY arrow direction XY, the three-dimensional effect occurs depending on the distance difference between the first display image of the first image display surface and the fourth display image of the fourth image display surface.

Figure 9:
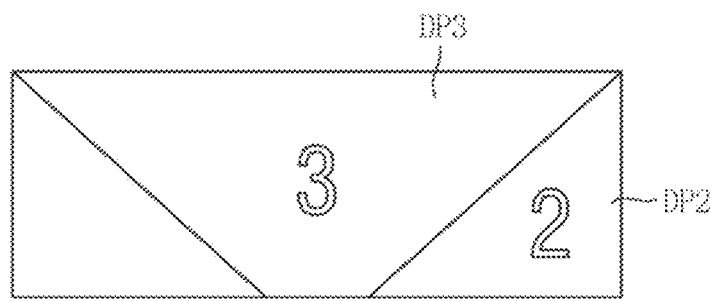
FIG. 9 is a top view illustrating image display surfaces of second and third display panels viewed in a sight line of a ZX arrow direction of FIG. 7 according to an embodiment of the present disclosure.
Figure 9:
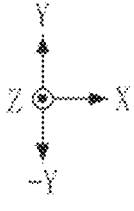

FIG. 9 is a top view illustrating image display surfaces of second and third display panels viewed in a sight line of a ZX arrow direction of FIG. 7.

Referring to FIGS. 7 and 9, the second flat panel-type display panel DP2 and the third flat panel-type display panel DP3 may also be disposed in parallel with each other in any one direction such as the relatively long side direction.

The second flat panel-type display panel DP2 and the third flat panel-type display panel DP3 are maintained and disposed at the first interval wy1 (e.g., in the Z direction) corresponding to the length of each of the first flat panel-type display panel DP1 and the fourth flat panel-type display panel DP4 in the relatively short side direction.

The first interval wy1 is also maintained between the second image display surface of the second flat panel-type display panel DP2 and the third image display surface of the third flat panel-type display panel DP3 by the first interval wy1 (e.g., in the Z direction) between the second flat panel-type display panel DP2 and the third flat panel-type display panel DP3. Accordingly, a three-dimensional effect occurs depending on a distance difference between a third display image of the third image display surface and a second display image of the second image display surface (e.g., in the Z direction). For example, in a sight line of a ZX arrow direction ZX, the three-dimensional effect occurs depending on the distance difference between the second display image of the second image display surface and the third display image of the third image display surface.

Figure 10:
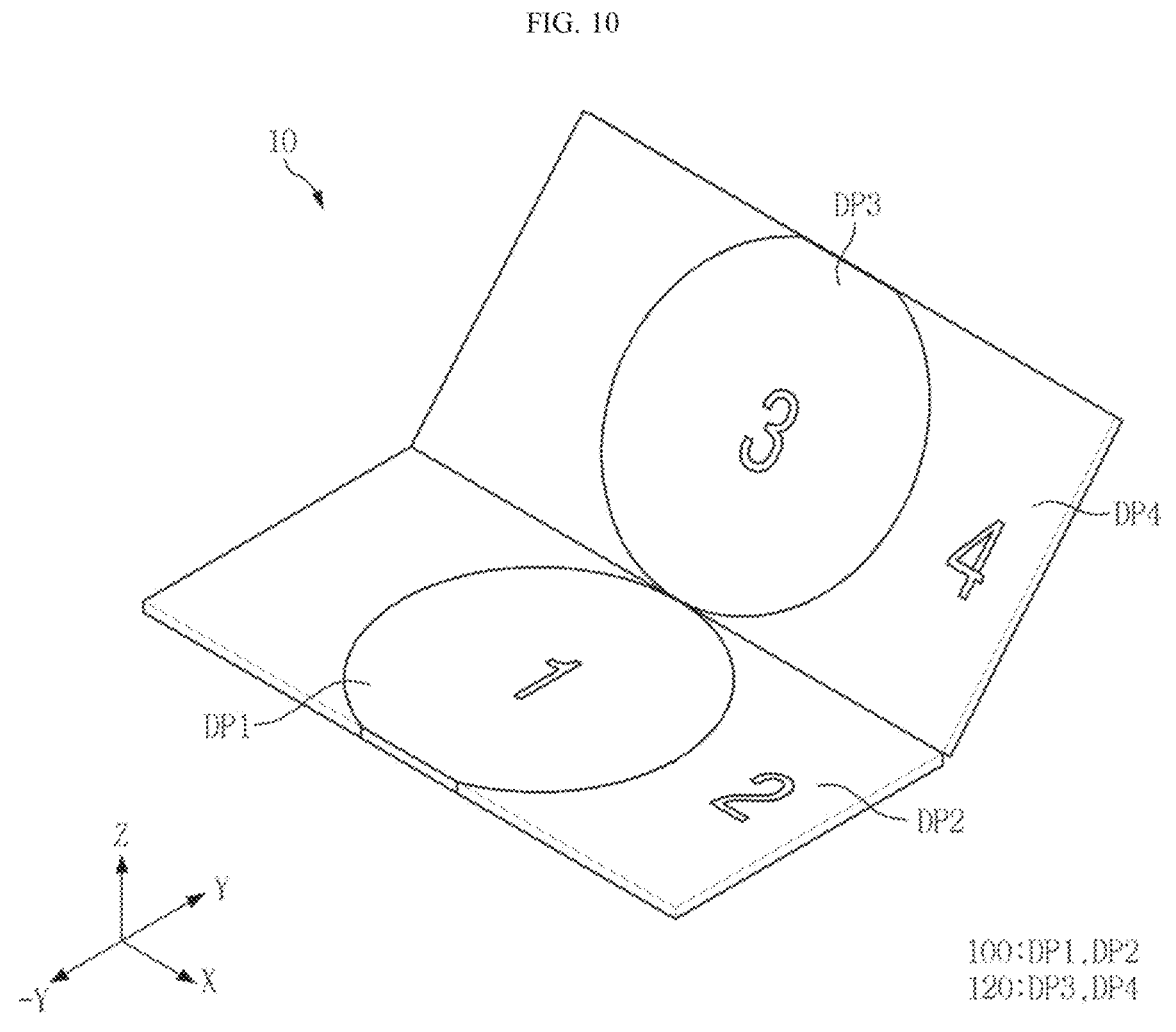

FIG. 10 is a perspective view illustrating a display device according to a embodiment of the present disclosure.

Referring to FIG. 10, the first flat panel-type display panel DP1 of the first foldable panel 100 may be formed in a circular shape in the plan view.

In an embodiment, one end of the first flat panel-type display panel DP1 is assembled to a first folding module formed at one end of the second flat panel-type display panel DP2, and a rear surface of the first flat panel-type display panel DP1 is folded into or unfolded from an inner hole area formed in the second flat panel-type display panel DP2.

For example, in an embodiment the first flat panel-type display panel DP1 may be folded in the Y-axis direction, and the rear surface of the first flat panel-type display panel DP1 may be coupled to the inner hole area of the second flat panel-type display panel DP2. In an embodiment, the inner hole area of the second flat panel-type display panel DP2 may be formed in a groove shape having a rear surface that is closed by a rear surface cover or formed in a hole shape having a rear surface that is opened.

When the first and second flat panel-type display panels DP1 and DP2 are folded and coupled to each other, the rear surface of the first flat panel-type display panel DP1 is folded into the inner hole area formed in the second flat panel-type display panel DP2 and the first foldable panel 100 may form a plate shape.

In an embodiment, the second flat panel-type display panel DP2 may be formed in a polygonal shape such as a rectangular shape or a square shape in the plan view in addition to the circular shape in the plan view.

In an embodiment, the inner hole area having a shape corresponding to an outline shape and a size (e.g., an area) in the plan view of the first flat panel-type display panel DP1 is formed at a center portion of a front surface including one side surface of the second flat panel-type display panel DP2. For example, in an embodiment the second flat panel-type display panel DP2 may be formed in a rectangular shape, in the plan view, having relatively long sides formed in the transverse direction, which is the X-axis direction.

A second image display surface of the second flat panel-type display panel DP2 is formed in at least one side surface direction of the inner hole area so as to surround at least one side surface of the inner hole area. Depending on a shape of the second flat panel-type display panel DP2 in the plan view and a shape in the plan view of the inner hole area corresponding to the first flat panel-type display panel DP1, the second image display surfaces having a semicircular shape, a columnar or cylindrical shape, or a polygonal shape such as a triangular shape or a quadrangular shape in the plan view may be formed in a front surface direction of the second flat panel-type display panel DP2. As illustrated in FIG. 10, in an embodiment the second image display surfaces having a polygonal shape in which a concave curved line and straight lines are combined with each other may be formed in the second flat panel-type display panel DP2.

In an embodiment, the third flat panel-type display panel DP3 of the second foldable panel 120 may also be formed in a circular shape in the plan view so as to correspond to the first flat panel-type display panel DP1. In an embodiment, one end of the third flat panel-type display panel DP3 is assembled to a second folding module formed at one end of the fourth flat panel-type display panel DP4, and a rear surface of the third flat panel-type display panel DP3 is folded into or unfolded from an inner hole area formed in the fourth flat panel-type display panel DP4.

When the third and fourth flat panel-type display panels DP3 and DP4 are folded and coupled to each other, the rear surface of the third flat panel-type display panel DP3 is folded into the inner hole area formed in the fourth flat panel-type display panel DP4 and the second foldable panel 120 may form a plate shape.

In an embodiment, the fourth flat panel-type display panel DP4 may be formed in a polygonal shape such as a rectangular shape or a square shape in the plan view in addition to a circular shape in the plan view. In an embodiment, the inner hole area having a shape corresponding to an outline shape and a size (e.g., an area) in the plan view of the third flat panel-type display panel DP3 is formed at a center portion of a front surface including one side surface of the fourth flat panel-type display panel DP4.

In an embodiment, a fourth image display surface of the fourth flat panel-type display panel DP4 is formed in at least one side surface direction of the inner hole area so as to surround at least one side surface of the inner hole area. Depending on a shape of the fourth flat panel-type display panel DP4 in the plan view and a shape in the plan view of the inner hole area corresponding to the third flat panel-type display panel DP3, the fourth image display surfaces having a polygonal shape in which a concave curved line and straight lines are combined with each other may be formed in a front surface direction of the fourth flat panel-type display panel DP4.

Also in a embodiment in which one end of the first flat panel-type display panel DP1 disposed and maintained at the angle of 90° is bound to the other end of the third flat panel-type display panel DP3 disposed and maintained at the angle of 90° and an end of the second flat panel-type display panel DP2 disposed and maintained at the angle of 90° is bound to (e.g., secured to) one end of the fourth flat panel-type display panel DP4 disposed and maintained at the angle of 90°, the first flat panel-type display panel DP1 and the fourth flat panel-type display panel DP4 may be disposed in parallel with each other in any one direction such as the relatively long side direction.

The second interval wy2 is also maintained between the first image display surface of the first flat panel-type display panel DP1 and the fourth image display surface of the fourth flat panel-type display panel DP4 by the interval between the first flat panel-type display panel DP1 and the fourth flat panel-type display panel DP4. Accordingly, a three-dimensional effect occurs depending on a distance difference between a first display image of the first image display surface and a fourth display image of the fourth image display surface.

The first interval wy1 is also maintained between the second image display surface of the second flat panel-type display panel DP2 and the third image display surface of the third flat panel-type display panel DP3 by the interval between the second flat panel-type display panel DP2 and the third flat panel-type display panel DP3. Accordingly, a three-dimensional effect occurs depending on a distance difference between a third display image of the third image display surface and a second display image of the second image display surface.

In concluding the detailed description, those skilled in the art will appreciate that many variations and modifications can be made to the described embodiments without substantially departing from the principles of the present disclosure. Therefore, the described embodiments of the present disclosure are used in a generic and descriptive sense only and not for purposes of limitation.

What is claimed is:

1. A display device comprising:
a first foldable panel including a first flat panel-type display panel having a circular shape or a polygonal shape in a plan view and a second flat panel-type display panel disposed in a folded or unfolded structure with the first flat panel-type display panel and having a plate shape in the plan view, wherein the first flat panel-type display panel is foldable into a first inner hole area defined in the second flat panel-type display panel; and
a second foldable panel including a third flat panel-type display panel having a circular shape or a polygonal shape in the plan view and a fourth flat panel-type display panel disposed in a folded or unfolded structure with the third flat panel-type display panel and having a plate shape in the plan view, wherein the third flat panel-type display panel is foldable into a second inner hole area defined in the fourth flat panel-type display panel,
wherein the first and third flat panel-type display panels have a same shape as each other.

2. The display device of claim 1, wherein:
one end of the first flat panel-type display panel is secured to a first folding module disposed at one end of the second flat panel-type display panel; and
a rear surface of the first flat panel-type display panel is foldable into and unfoldable from the first inner hole area.

3. The display device of claim 2, wherein the first flat panel-type display panel has a circular shape, a triangular shape, a quadrangular shape, a pentagonal shape, or a hexagonal shape in the plan view.

4. The display device of claim 2, wherein the first flat panel-type display panel is foldable into the first inner hole area, wherein the first flat panel-type display panel is coupled to the second flat panel-type display panel in a plate shape in the plan view when folded into the first inner hole area;
first and second image display surfaces of the first and second flat panel-type display panels are disposed towards a same direction in the plate shape in the plan view when the first flat panel-type display panel is folded into the first inner hole area; and
the first flat panel-type display panel is unfoldable towards the one end by the first folding module.

5. The display device of claim 2, wherein:
the second flat panel-type display panel has a circular shape, a triangular shape, a quadrangular shape, a pentagonal shape or a hexagonal shape in the plan view; and
the first inner hole area has a shape corresponding to an outline shape and a size in the plan view of the first flat panel-type display panel and is positioned at a center portion of a front surface of the second flat panel-type display panel and includes at least one end of the second flat panel-type display panel.

6. The display device of claim 5, wherein:
at least one second image display surface is disposed in at least one side surface direction of the first inner hole area in the second flat panel-type display panel and surrounds at least one side surface of the first inner hole area; and
the second image display surface has a semicircular shape, a columnar shape, a cylindrical shape, a triangular shape, a quadrangular shape or a polygonal shape having a curved line and a straight line combined with each other in the plan view based on a shape of the second flat panel-type display panel in the plan view and a shape of the first inner hole area in the plan view.

7. The display device of claim 2, wherein:

one end of the third flat panel-type display panel is secured to a second folding module disposed at one end of the fourth flat panel-type display panel; and a rear surface of the third flat panel-type display panel is foldable into and unfoldable from the second inner hole area.

8. The display device of claim 7, wherein:

the third flat panel-type display panel has a circular shape, a triangular shape, a quadrangular shape, a pentagonal shape or a hexagonal shape in the plan view; and the first flat panel-type display panel and the third flat panel-type display panel have a same shape as each other.

9. The display device of claim 7, wherein:

the third flat panel-type display panel is foldable into the second inner hole area, wherein the third flat panel-type display panel is coupled to the fourth flat panel-type display panel in a plate shape in the plan view when folded into the second inner hole area; and third and fourth image display surfaces of the third and fourth flat panel-type display panels are disposed towards a same direction in the plate shape in the plan view when the third flat panel-type display panel is folded into the second inner hole area; and the third flat panel-type display panel is unfoldable towards the one end by the second folding module.

10. The display device of claim 7, wherein:

the fourth flat panel-type display panel has a circular shape, a triangular shape, a quadrangular shape, a pentagonal shape or a hexagonal shape in the plan view;

the second flat panel-type display panel and the fourth flat panel-type display panel have a same shape as each other; and the second inner hole area has a shape corresponding to an outline shape and a size in the plan view of the third flat panel-type display panel and is positioned at a center portion of a front surface of the fourth flat panel-type display panel and includes at least one end of the fourth flat panel-type display panel.

11. The display device of claim 10, wherein:

at least one fourth image display surface is disposed in at least one side surface direction of the second inner hole area in the fourth flat panel-type display panel and surrounds at least one side surface of the second inner hole area; and the fourth image display surface has a semicircular shape, a columnar or cylindrical shape, a triangular shape, a quadrangular shape or a polygonal shape having a curved line and a straight line combined with each other in the plan view based on a shape of the fourth flat panel-type display panel in the plan view and a shape of the second inner hole area in the plan view.

12. The display device of claim 7, wherein the first flat panel-type display panel is unfoldable by the first folding module arranged in a direction of the one end of the second flat panel-type display panel, wherein the first flat panel-type display panel and the second flat panel-type display panel are disposed at an angle of 90° with respect to each other when the first flat panel-type display panel is unfolded.

13. The display device of claim 12, wherein the third flat panel-type display panel is unfoldable along a disposition direction of the second folding module disposed in a direction of the one end of the fourth flat panel-type display panel, wherein the third flat panel-type display panel and the fourth flat panel-type display panel are disposed at an angle of 90° with respect to each other when the third flat panel-type display panel is unfolded.

14. The display device of claim 13, wherein:

a second end of the first flat panel-type display panel disposed and maintained at the angle of 90° is secured to the a second end of the third flat panel-type display panel disposed and maintained at the angle of 90°; and a second end of the second flat panel-type display panel disposed at the angle of 90° is secured to a second end of the fourth flat panel-type display panel disposed and maintained at the angle of 90°.

15. The display device of claim 14, wherein:

the first flat panel-type display panel and the fourth flat panel-type display panel are disposed in parallel with each other in any one direction;

the second flat panel-type display panel and the third flat panel-type display panel are disposed in parallel with each other in any one direction;

a first image display surface of the first flat panel-type display panel and a fourth image display surface of the fourth flat panel-type display panel are disposed towards a same first direction; and a second image display surface of the second flat panel-type display panel and a third image display surface of the third flat panel-type display panel are disposed towards a same second direction different from the first direction by 90°.

16. The display device of claim 14, wherein:

the second flat panel-type display panel and the third flat panel-type display panel are disposed at a first interval corresponding to a length of each of the first flat panel-type display panel and the fourth flat panel-type display panel in a short side direction; and the first flat panel-type display panel and the fourth flat panel-type display panel are maintained and disposed at a second interval corresponding to a length of each of the second flat panel-type display panel and the third flat panel-type display panel in the short side direction.

17. A display device comprising:

a first foldable panel including a first flat panel-type display panel having a circular shape, a triangular shape, a quadrangular shape, a pentagonal shape or a hexagonal shape in a plan view and a second flat panel-type display panel having a plate shape in the plan view, wherein the first flat panel-type display panel is foldable into or unfoldable from a first inner hole area defined in the second flat panel-type display panel; and a second foldable panel including a third flat panel-type display panel having a circular shape, a triangular shape, a quadrangular shape, a pentagonal shape or a hexagonal shape in the plan view and a fourth flat panel-type display panel having a plate shape in the plan view, wherein the third flat panel-type display panel is foldable into or unfoldable from a second inner hole area defined in the fourth panel-type display panel, wherein the first and third flat panel-type display panels have a same shape as each other; and the first inner hole area has a shape corresponding to an outline shape and a size in the plan view of the first flat panel-type display panel at a center portion of a front surface including one end of the second flat panel-type display panel.

18. The display device of claim 17, wherein:

the first flat panel-type display panel and the third flat panel-type display panel have a circular shape; and the second flat panel-type display panel and the fourth flat panel-type display panel have a polygonal shape having a curved line and a straight line combined with each other in the plan view.

19. The display device of claim 17, wherein:

one end of the first flat panel-type display panel is secured to a first folding module disposed at one end of the second flat panel-type display panel; and a rear surface of the first flat panel-type display panel is foldable into and unfoldable from the first inner hole area.

20. The display device of claim 19, wherein the first flat panel-type display panel is foldable into the first inner hole area, wherein the first flat panel-type display panel is coupled to the second flat panel-type display panel in a plate shape in the plan view when folded into the first inner hole area.

\* \* \* \* \*